UNITED STATES PATENT OFFICE.

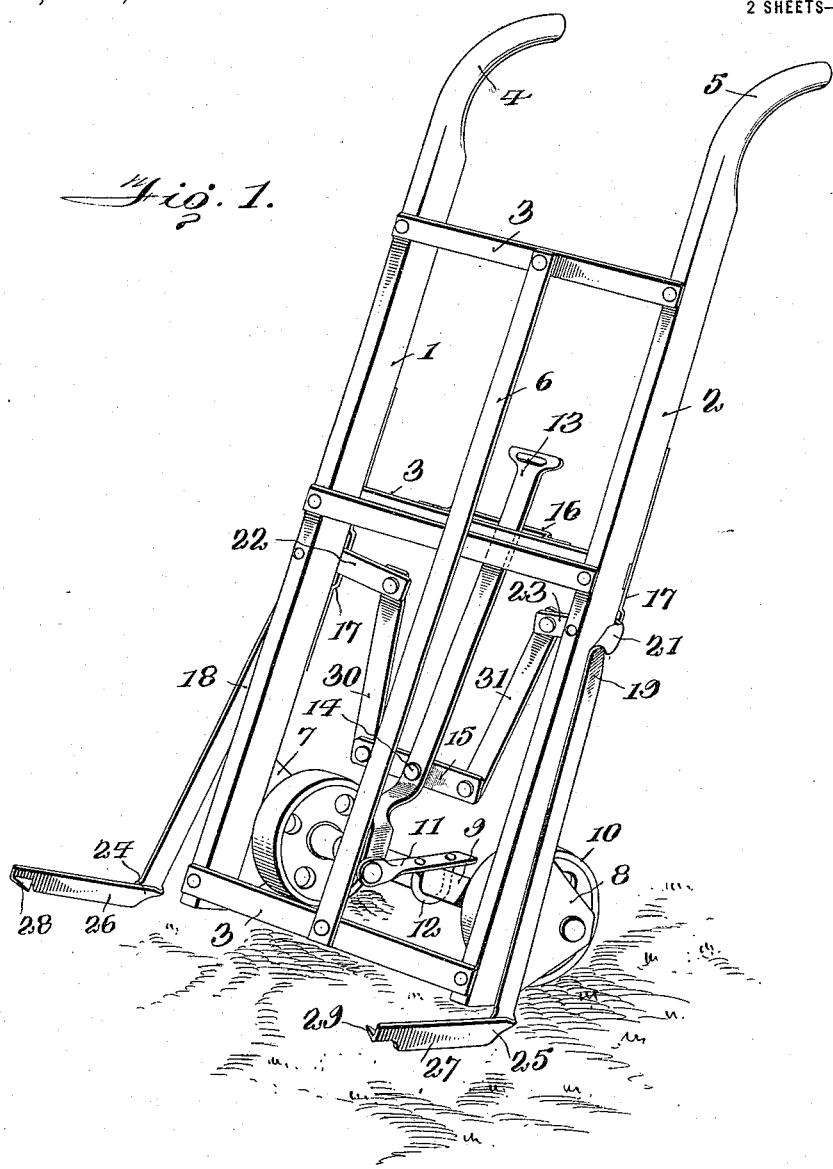

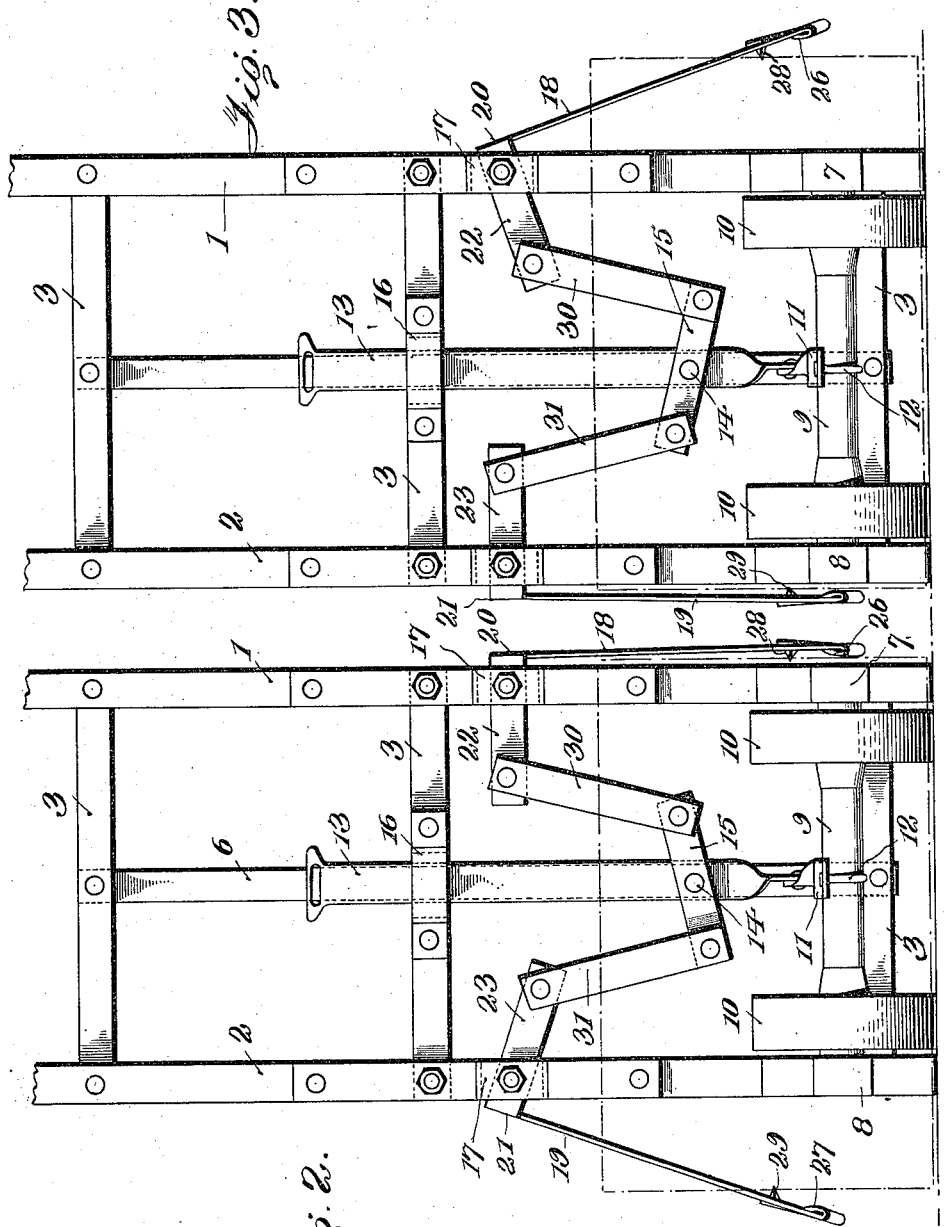

OSCAR HOVDE, OF HELENA, MONTANA.

HAND-TRUCK.

1,165,507. Specification of Letters Patent. Patented Dec. 28, 1915.

Application filed April 20, 1912. Serial No. 692,071.

*To all whom it may concern:*

Be it known that I, OSCAR HOVDE, (who have declared my intention, by taking out my first papers, to become a citizen of the United States,) residing at Helena, in the county of Lewis and Clark, State of Montana, have invented certain new and useful Improvements in Hand-Trucks, of which the following is a description, reference being had to the accompanying drawing and to the figures of reference marked thereon.

The invention relates to improvements in hand trucks, for use especially in stores or warehouses for facilitating the handling of crated materials and produce, such as eggs and the like.

The primary object of the invention is to provide a wheeled hand truck, in which the material to be loaded thereon is positively gripped, irrespective of the exact centering of the truck with relation to the article to be handled.

The invention, therefore, consists in the improvements hereinafter described and referred to in the appended claims.

In the drawings, Figure 1 is a perspective view of a truck embodying my invention; Fig. 2 is a rear elevation of the truck illustrating the manner in which a crate or other article (shown in dotted lines) is gripped, that has not been properly centered with respect to the truck; Fig. 3 is a similar view illustrating the gripping of the crate, the opposite side thereof extending without the center of the truck.

In these drawings, 1 and 2 indicate the side bars of the truck held together by the cross straps 3, and provided at their upper ends with the handles 4 and 5. A strap 6 is shown as secured to the upper and lower cross bars, midway of the side bars, for supporting the loaded articles when rested upon the truck.

Secured to the lower ends of the side bars are bearing blocks 7 and 8, in which are journaled the ends of the axle 9, the latter having mounted thereon the usual wheels 10. A bar 11 is shown as secured to the axle 9 by means of the U-bolt 12, midway of the side bars 1 and 2. By this construction, the bar 11 is allowed to rock upon the axle. Pivoted to the bar 11 is an operating arm or lever 13, having pivoted thereon at 14 a laterally extending lever 15. This operating arm extends upwardly through a guide strap 16 fastened to one of the cross bars, within reach of the person operating the truck.

Pivotally secured to the rear side of the side bars within the guide straps 17, are angular gripping jaws 18 and 19, respectively. These gripping jaws are formed from flat strips of metal, bent as at 20 and 21, to form inwardly extending arms 22 and 23. At their opposite ends they are bent as at 24 and 25 to form forwardly extending arms 26 and 27. Prongs or gripping joints 28 and 29 are struck up from these arms at their outer extremities, so as to securely grip and transport the article. Connecting the inner ends of the arms 22 and 23 and the outer ends of the laterally extending lever 15, are links 30 and 31.

The operation is as follows: Referring to Fig. 1, the gripping jaws are shown as extending equally without the side bars of the truck. Now assuming the truck is centered with respect to the article to be loaded, *i. e.*, the truck has been brought directly up to the material to be transported, so that equal portions of it extend to either side, an upward pull upon the operating arm or lever 13 will, by reason of its pivotal connection to the axle, raise the lever 15 carried by it, and thus in turn thrust upward the links 30 and 31. The links forcing upwardly upon the inner end of the arms of the gripping jaws, will cause the forwardly extending arms 26 and 27 to be drawn inwardly toward the sides of the article to be loaded. When the truck has been properly centered, the gripping jaws move in unison, and grip the sides of the article simultaneously.

Referring to Figs. 2 and 3, wherein is shown uncentered positions of the truck with respect to the article to be loaded, the operation of the gripping jaws is different. In Fig. 2, the truck is shown as having been wheeled up to the article in an uncentered position, with the left end of the article extending without the truck. As the truck is moved toward the article, the gripping jaws are opened by a downward thrust of the operating arm sufficiently wide to receive the same. The operating arm is then pulled upwardly and the same operation starts to take place as has been described, but, by reason of the uneven centering of the truck, one jaw grips the article on the side projecting without the truck in advance of the other jaw, and stops. A continued pull upon the operating arm will, by virtue of the locked position of one of the gripping jaws and its attending link, raise the lever 15 and the link 30, and this in turn the inner arm 22 of the other gripping jaw, until the latter's forwardly extending arm 26 contacts and grips the opposite side of the article. The article is now firmly held in place upon the truck, though to one side thereof.

Having thus described my invention, what I claim as new, and desire to secure by Letters Patent, is:—

1. In a truck having a suitable framework, gripping jaws pivotally mounted upon the framework, a member slidably mounted upon said framework and an equalizing member pivotally mounted upon said sliding-member and independent devices connecting said equalizing member and said gripping jaws, and operating to center said load gripping jaws upon the load when the same is off center with respect to the truck.

2. In a truck having a suitable framework, gripping jaws pivotally mounted upon the framework, an operating arm, a lever as 15 pivoted to said operating arm, and pivotal link connections between the lever and the gripping jaws whereby when one of the gripping jaws is locked the movement of the operating arm will continue to operate the other gripping jaw and bring it to contacting position with the article.

3. In a truck having a suitable framework, inwardly extending arms 22 and 23 to which the opposite gripping jaws are secured, said inwardly extending arms being pivoted to the framework, an operating lever, a lever 15 centrally pivoted thereto, and links 30 and 31 pivotally connected at one end to the lever 15 and at the other end respectively to the arms 22 and 23.

4. In a wheeled truck, a bar supported thereon, an operating arm or lever pivoted to said bar, a second lever pivotally secured to the operating arm, pivoted gripping jaws, and links connecting the gripping jaws with the second lever.

In testimony whereof, I affix my signature, in the presence of two witnesses.

OSCAR HOVDE.

Witnesses:
H. S. HEPNER,
EMMA BOWERS.

Copies of this patent may be obtained for five cents each, by addressing the "Commissioner of Patents, Washington, D. C."